United States Patent
Baj

(10) Patent No.: US 7,130,273 B2
(45) Date of Patent: Oct. 31, 2006

(54) QOS TESTING OF A HARDWARE DEVICE OR A SOFTWARE CLIENT

(75) Inventor: Michael Baj, Waltham, MA (US)

(73) Assignee: Level 3 Communications, Inc., Broomfield, CO (US)

( * ) Notice: Subject to any disclaimer, the term of this patent is extended or adjusted under 35 U.S.C. 154(b) by 918 days.

(21) Appl. No.: 09/826,697

(22) Filed: Apr. 5, 2001

(65) Prior Publication Data
US 2002/0145979 A1 Oct. 10, 2002

(51) Int. Cl.
*H04L 1/00* (2006.01)
*H04L 1/20* (2006.01)

(52) U.S. Cl. ............. 370/242; 370/246; 370/248; 370/252

(58) Field of Classification Search ........... 370/242, 370/248, 252, 271, 356, 495
See application file for complete search history.

(56) References Cited

U.S. PATENT DOCUMENTS

| | | | |
|---|---|---|---|
| 5,867,813 A | 2/1999 | Di Pietro et al. | |
| 5,961,599 A | 10/1999 | Kalavade et al. | |
| 6,259,691 B1 | 7/2001 | Naudus | |
| 6,275,797 B1 | 8/2001 | Randic | |
| 6,363,053 B1 | 3/2002 | Schutser et al. | |
| 6,370,120 B1 | 4/2002 | Williams et al. | |
| 6,404,764 B1 * | 6/2002 | Jones et al. | 370/352 |
| 6,437,229 B1 * | 8/2002 | Nobumoto | 84/615 |
| 6,477,492 B1 | 11/2002 | Connor | |
| 6,512,746 B1 | 1/2003 | Sand | |
| 6,570,969 B1 * | 5/2003 | Albal et al. | 379/126 |
| 6,600,740 B1 | 7/2003 | Valentine et al. | |
| 6,603,774 B1 | 8/2003 | Knappe et al. | |
| 6,633,582 B1 | 10/2003 | Panburana et al. | |
| 6,665,271 B1 | 12/2003 | Thomas et al. | |
| 6,700,953 B1 | 3/2004 | Maurer et al. | |
| 6,707,827 B1 * | 3/2004 | Shaffer et al. | 370/493 |
| 6,718,296 B1 | 4/2004 | Reynolds et al. | |
| 6,721,541 B1 | 4/2004 | Kingsley | |
| 6,735,175 B1 | 5/2004 | Havens | |
| 6,738,353 B1 | 5/2004 | Chong | |

(Continued)

FOREIGN PATENT DOCUMENTS

WO WO 00/72453 A1 11/2000

OTHER PUBLICATIONS

Author Unknown., "Omni-Q Voice Management System." Revision A. RADCOM, 2001.

(Continued)

*Primary Examiner*—Chi Pham
*Assistant Examiner*—Justin M. Philpott
(74) *Attorney, Agent, or Firm*—Faegre & Benson LLP

(57) ABSTRACT

A system for testing a software client or hardware module in a voice-over-IP (VoIP) network path includes a VoIP client, a test tool, and an analyzer. The VoIP client, connected to the VoIP network, makes a series of calls to a destination. The calls activate the software client or hardware module under test. The test tool, which has access to the network, plays a series of audio files over the VoIP during the calls. The test tool also polls the software client or hardware module over the network for status information after the calls are completed. While the audio files are being played, the analyzer records the audio files at the destination for measurement the quality of the calls. Accordingly, the quality of voice connection on the VoIP network can be measured, and specific components on the network can be tested.

26 Claims, 3 Drawing Sheets

U.S. PATENT DOCUMENTS

| | | | |
|---|---|---|---|
| 6,741,569 | B1 | 5/2004 | Clark |
| 6,748,433 | B1 | 6/2004 | Yaakov |
| 6,754,232 | B1 | 6/2004 | Tasker |
| 6,778,496 | B1 | 8/2004 | Meempat et al. |
| 6,834,040 | B1 | 12/2004 | Tomberlin |
| 6,862,298 | B1 * | 3/2005 | Smith et al. ............... 370/516 |
| 6,876,647 | B1 | 4/2005 | Celi |
| 6,940,820 | B1 | 9/2005 | Fang |
| 2002/0143979 | A1 | 10/2002 | Douceur et al. |
| 2002/0167936 | A1 | 11/2002 | Goodman |
| 2003/0009306 | A1 * | 1/2003 | Fang ........................ 702/122 |

OTHER PUBLICATIONS

Conway, A.E., "A Passive Method for Monitoring Voice-Over-IP Call Quality with ITU-T Objective Speech Quality Measurement Methods." Apr. 28-May 2, 2002; Communications, 2002. ICC 2002. IEEE International Conference, vol. 4. pp. 2583-2586.

De, B.S et al., "End-to-End Voice Over IP Testing and the Effect of QOS on Signaling." Mar. 16-18, 2003; System Theory, 2003. Proceedings of the 35th Southeastern Symposium, pp. 142-147.

Rix, A.W. et al. "The Perceptual Analysis Measurement System for Robust End-to-End Speech Quality Assessment." Jun. 5-9, 2000; Acoustics, Speech and Signal Processing, 2000, ICASSP' 00. Proceedings. 2000 IEEE International Conference, vol. 3.

Ma, Angus; "Voice over IP (VoIP) Testing Methodology and Case studies"; Spirentcom White Paper, 'Online! Feb. 2001 (2001-02); pp. 1-33; Spirent Communications; www.spirentcom.com.

Reynolds et al.; "Quality VoIP—an engineering challenge"; BT Technol J; pp. 23-32; vol. 19, No. 2, Apr. 2, 2001; BT Laboratories, GB.

Cole et al.; "Voice Over IP Performance Monitoring", Computer Communication Review; ACM SIGCOMM, Apr. 2001; pp. 9-24; Middletown, NJ; US; AT&T Laboratories.

* cited by examiner

QOS TESTING OF A HARDWARE DEVICE OR A SOFTWARE CLIENT

TECHNICAL FIELD

This invention relates to testing the Quality of Service (QoS) of a hardware module or a software client in a Voice-over-IP (VOIP) network path.

BACKGROUND

Voice-over-IP (VoIP) is a technique for delivering voice information over a network that employs the Internet Protocol (IP). The network, called a VoIP network, transmits voice information digitally in the form of voice packets. The VoIP network is different from a public-switched telephone network (PSTN), which transmits voice signals as a stream of analog signals. Protocols used by the PSTN generally include IXC (Interchange Carrier), LEC (Local Exchange Carrier), and C-LEC (Competitive Local Exchange Carrier), which transmit analog voice signals in a manner different from the IP.

Although a VoIP network is different from a PSTN in many aspects, a phone call that originates from a PSTN can be sent over the VoIP network to a computer. Conversely, voice packets originating from the Internet can also be sent over the VoIP to reach a telephone on a PSTN. For example, an Internet Telephony Service Provider (ITSP) network is a VoIP network. The ITSP network is built on the physical infrastructure of the Internet, and further includes gateways to perform appropriate conversions for transmitting calls between a PSTN and the Internet. The gateway includes conversion circuits for performing analog-to-digital and digital-to-analog conversions, as well as appropriate protocol conversions.

For voice packets received from the Internet, the gateway converts them into analog signals, and sends the analog signals to the PSTN. The gateway also converts analog signals coming from the PSTN into voice packets. The gateway performs the conversions in both directions at the same time, allowing a full-duplex (two-way) conversation to take place between users connected to either the Internet or the PSTN.

Compared to transmissions of data packets, voice transmissions are more susceptible to delays and variations in the delays. The delay variations, also called jitters, can greatly distort voice signals and render them unrecognizable to a user. Therefore, maintaining a Quality of Service (QoS) acceptable to a user is an important issue in voice transmissions. Furthermore, because the IP is a "best effort" protocol that generally does not guarantee QoS, there is no assurance of the quality of voice transmissions over a VoIP network. Some VoIP networks therefore use an improved version of the IP, called Real-Time Protocol (RTP), to transmit voice packets to ensure QoS and timely delivery of the voice packets. RTP provides end-to-end delivery services of real-time audio and video.

Quality of voice transmissions can be determined using conventional measurements for data transmissions, such as distortions, packet loss, and signal-to-noise ratio. However, characteristics of voice transmissions are different from those of data transmissions in many aspects. One of the most distinctive aspects of voice transmissions is the subjectivity of voice quality. Standards have been developed to measure the quality of voice transmissions from the perspective of a listener. The standards include Perceptual Speech Quality Measurement (PSQM) and Perceptual Analysis-Measurement System (PAMS).

PSQM is an ITU standard that defines an algorithm for estimating the subjective quality of voice-band speech codecs (coder-decoder). PSQM is an advanced version of MOS (Mean Opinion Score) algorithm, which has been widely used as a subjective means to rate vocoders (voice coder). Scores produced by the PSQM algorithm range from a scale of 1 (ideal) to 5 (poor). The PSQM scores can be converted to MOS scores by a standard formula.

The PSQM algorithm measures distortions of a speech signal when transmitted through various codecs and transmission media. It can effectively measure voice quality on IP networks and wireless networks. Unlike measurement of signal-to-noise ratios, the PSQM algorithm measures distortions in an internal psycho-acoustic domain to mimic the sound perception of people (e.g., phone users) in real-life situations, so that the measured distortions can be correlated with human perceptions. The PSQM algorithm converts signals in a physical domain into the perceptually meaningful psycho-acoustic domain through a series of nonlinear processes. The processes generally include time-frequency mapping, frequency warping, intensity warping, loudness scaling, asymmetric masking, cognitive modeling, and so forth.

Another important standard for measuring clarity of voice signals as perceived by a human is Perceptual Analysis-Measurement System (PAMS). The PAMS uses a perceptual model similar to that of PSQM to provide a repeatable, objective means for measuring perceived voice quality. The PAMS uses an effective signal processing model to produce a number of types of scores. The PAMS provides a "listening-quality" and a "listening-effort" score, both of which can be converted to MOS scores and are on the same 1-to-5 scale.

Voice quality on an IP network can be determined using the above standards together with the conventional measurements for data transmissions. Deterioration of voice quality is often an indicator of a problem in the network. Frequently, the problem in the network is in a hardware module or a software client along a transmission path of the voice signals.

SUMMARY

The invention relates to testing the Quality of Service (QoS) of a component (e.g., a hardware module or a software client) in a Voice-over-IP (VOIP) network path. In a general aspect of the invention, a method of testing a component in a VoIP network sending a digital audio file through the component to a destination; recording the digital audio file at the destination; and measuring characteristics of the recording to analyze the component.

Embodiments of this aspect of the invention may include one or more of the follow features.

The method further includes polling the component for status information. The method repeats sending, and recording, or sending, recording, and measuring for a predetermined number of times.

The method also includes generating a call history of the component based on the status information, or the measuring of the recording.

In another aspect of the invention, a system for testing a component on a voice-over-IP network includes a source node, a path, and an analyzer. The path connects the source node through a component to a destination node. The analyzer, being connected to the destination node, measures characteristics of a digital audio file received by the destination node.

Embodiments of this aspect of the invention may include one or more of the follow features.

The digital audio file is contained in a digital audio store. The digital audio file is a WAV file. The network further includes a test tool accessible by the source node to poll the component for status information.

In another aspect of the invention, a computer program product residing on a computer readable medium comprises instructions that cause the computer to: record a digital audio file received at a destination, the digital audio file being sent through a component; and measure characteristics of the recording to analyze the component.

In yet another aspect of the invention, a computer program product residing on a computer readable medium comprises instructions that cause the computer to: send a digital audio file to a destination through a component; and poll the component for status information.

The invention advantageously provides an efficient approach for testing a specific hardware device or a software client on a VoIP network. It also provides a means for performing QoS testing in a VoIP network path using a PC client and a test tool.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
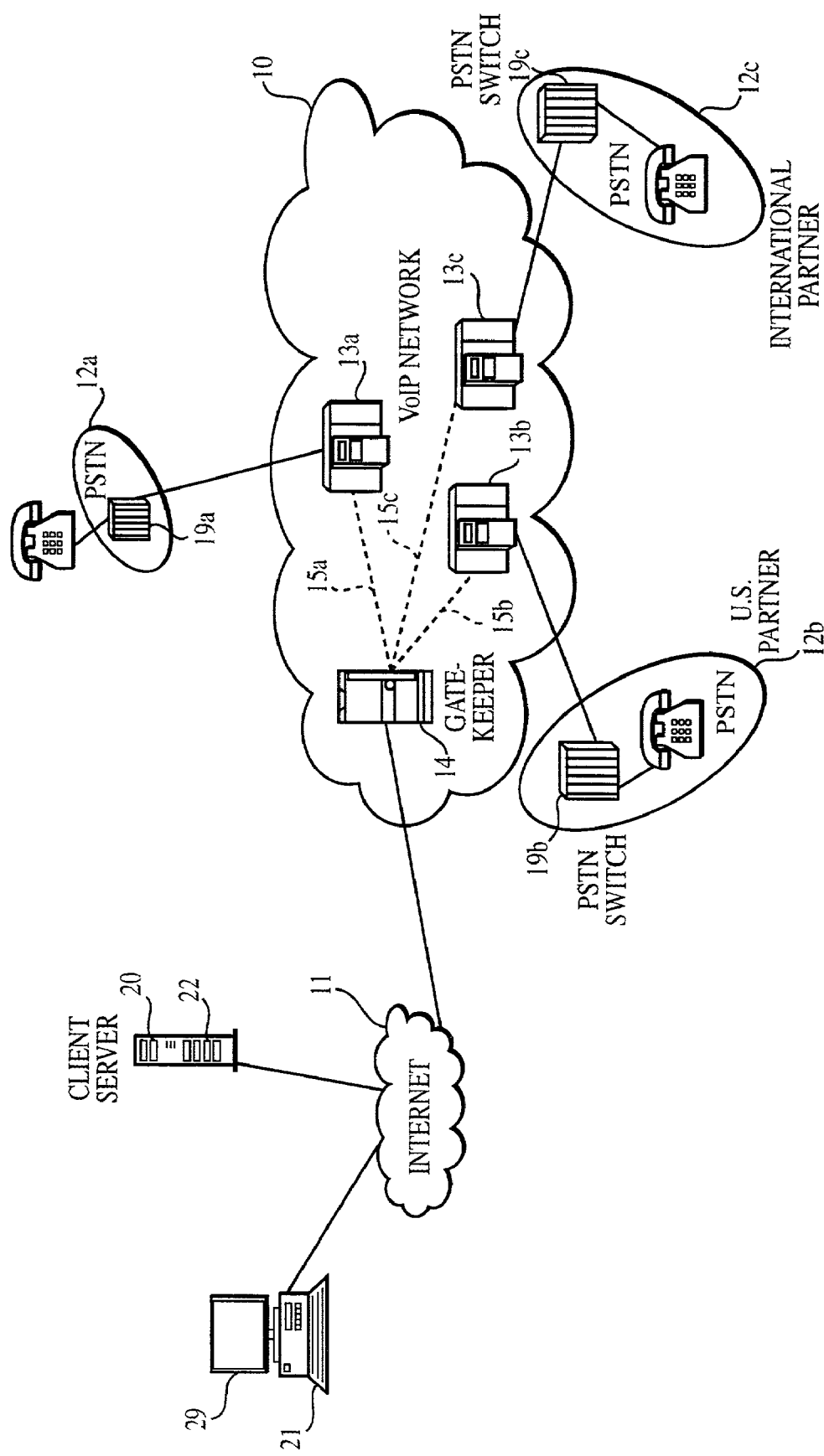
FIG. 1 is a system diagram of a Voice-over-IP network.

Referring to FIG. 1, a Voice-over-Internet Protocol (VoIP) network 10 is connected to a communication network 11 (e.g., the Internet) and a local PSTN 12a, a regional PSTN 12b, and an international PSTN 12c. VoIP network 10 includes a gatekeeper 14 and gateways 13a, 13b, and 13c, which are connected to gatekeeper 14, either directly or indirectly, by VoIP links 15a, 15b, and 15c, respectively. VoIP links 15a, 15b, and 15c use the same communication protocols (e.g., IP or RTP) as the Internet for transmitting digital packets. Gateways 13a, 13b, and 13c are also interconnected by communication links (not shown) that use IP or RTP protocols.

Gateways 13 provide translations of protocols for call setup and release, and conversions of media formats between different networks. Gatekeeper 14 provides call-control services for end-points, such as addressing, authorization, and authentication of terminals and gateways; bandwidth management; accounting; billing; charging; and sometimes call-routing services. Gatekeeper 14 includes a routing table to route incoming VoIP calls to specified destinations according to destination addresses of the calls. A destination address can be an IP address for a computer, e.g., a PC (Personal Computer) 29 on Internet 11, or a phone number for a telephone on PSTN 12a, 12b, or 12c. If an incoming call originates from Internet 11, and the destination address specifies a phone number in one of the PSTNs 12, gatekeeper 14 will route the incoming call to one of gateways 13a, 13b, and 13c according to the area code or country code of the phone number. After the gateway 13 converts the call to analog signals, it forwards the call to the PSTN 12 specified by the phone number. Each of the PSTNs 12 respectively includes a PSTN switch 19a, 19b or 19c for switching calls within its network to reach specified destinations.

If an incoming call is from one of the PSTNs 12, and the destination address specifies an IP address of a computer, e.g., PC 29, on Internet 11, gatekeeper 14 will route the call to an appropriate routing node (not shown) on Internet 11. In this scenario, signals received by gatekeeper 14 have already been converted to digital by one of gateways 13a, 13b, and 13c.

Figure 2:
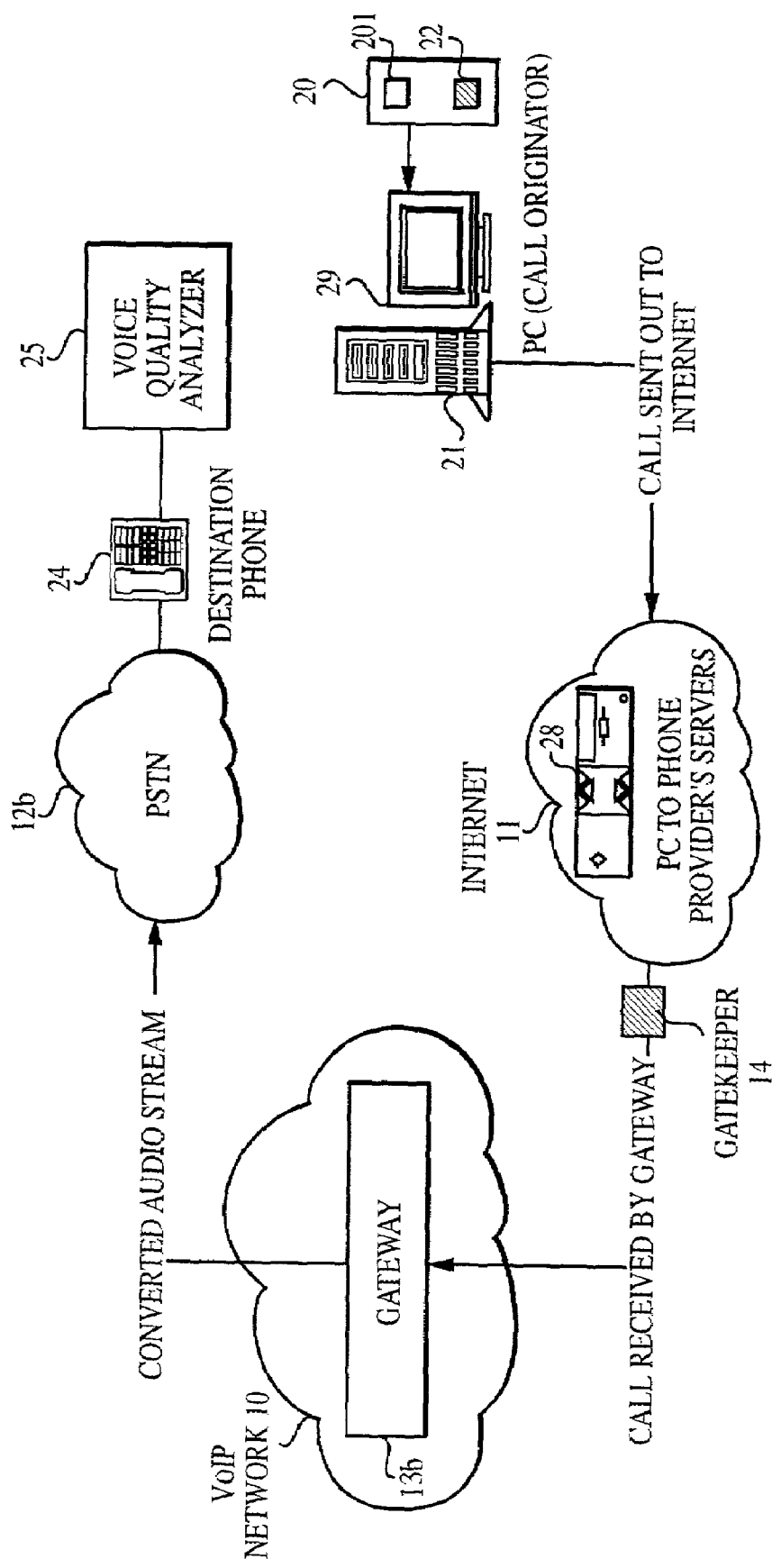
FIG. 2 illustrates a set-up for a test for detecting problems on the network.

Transmissions of voice information as described above involve a number of devices that contain hardware modules or run software clients. Any problem in these hardware modules and software clients can impair voice quality or disrupt service of the voice transmissions. To ensure the QoS of the voice transmissions, a client server 20 including a test tool 22 is connected to PC 29, either indirectly via Internet 11 as in FIG. 1, or directly as shown in FIG. 2. Test tool 22 receives commands from PC 29 to perform test procedures as will be discussed in detail below.

Referring now to FIG. 2, client server 20 also includes a memory 201 for storing audio files, which are data files in a digital audio format that can be played by an audio playing device residing on test tool 22. When commanded by a VoIP client 21 that runs on PC 29, test tool 22 retrieves an audio file from memory 201 and plays it. The audio file is played in a call placed by VoIP client 21.

In order to test the quality of voice transmissions on VoIP network 10, VoIP client 21 executes call initialization scripts to make a series of calls over the network. If a problem occurs in a transmission path, for example, degraded voice quality or persistent call unavailability, a diagnostic procedure can be used to identify one or more software clients or hardware modules among network resources that reside in the transmission path as a likely cause of the problem. A hardware module can be a DSP (Digital Signal Processor) chip that samples an analog signal into a digital format, or a filter that removes noise from the signal. A software client can be a system script for setting-up a connection, or an IVR (Interactive Voice Response) module that allows a touch-tone telephone user to interact with a database to access information in the database.

For example, if calls going through a particular gateway consistently experience high distortions, the diagnostic procedure can direct calls to other gateways to see whether the distortions still exist. If the calls going through other gateways do not experience the same high distortions, then the particular gateway is identified as a likely cause of the distortion problem.

If gateway 13b, for example, is identified as a likely cause of a network problem, VoIP client 21 will execute the call initiation scripts to place a series of calls through gateway 13b to a given destination. Quality of the calls is measured at the destination. Components of gateway 13b, such as hardware modules, software clients, or a combination of both, that participate in the calls are identified. Further tests on the components, such as polling as described below, can be performed to pinpoint the network problem.

When placing a call, VoIP client 21 first establishes a transmission path between the VoIP client 21 and destination phone 24. After the transmission path is established, VoIP client 21 invokes test tool 22 to play a digital audio file, e.g., a WAV file, which is stored in memory 201. The WAV file uses a "*.WAV" extension, and is in a digital audio format used by the Microsoft Windows® Operating System (O/S). A WAV file can be used to record different sound qualities. Specifically, a WAV file records voice signals in either 8-bit or 16-bit samples at rates of 11025 Hz, 22050 Hz, or 44100 Hz. With respect to storage space, an exemplary WAV file with the highest quality (16-bit samples at 44100 Hz) requires about 88KByte of storage per second. In other embodiments, other digital audio file formats may be utilized, as dictated by the operating system, such as Unix or Linux.

Memory 201 stores a WAV file that includes speech patterns containing the entire range of human voice, including male, female, child, and adult. The WAV file can be incomprehensible to human ears. The speech patterns stored in the WAV file are designed to include voice of different pitches and intensities in order to fully exercise all features of the components under test. Other WAV files appropriate for the purpose of testing can also be used by test tool 22.

Test tool 22 plays a WAV file each time VoIP client 21 makes a call. The WAV file is played in the call, and is sent to Internet 11 in the form of voice packets. In one scenario, PC 29 subscribes to services offered by a PC-to-Phone provider's server 28 to obtain access to Internet 11. Provider's server 28 verifies the call to see whether it comes from a registered PC. After the call is verified, provider's server 28 forwards the call to gatekeeper 14, which routes the call to gateway 13b. Gateway 13b converts the received voice packets to an analog audio stream, and sends the audio stream to PSTN 12b to reach a destination phone 24, which is connected to a voice quality analyzer 25. Analyzer 25 records the received audio stream during the call. Once the WAV file is played in full, VoIP client 21 terminates the call.

The recorded audio stream can be analyzed by analyzer 25 during the call, after the call is terminated, or after the series of calls are completed. Analyzer 25 measures the quality of the recorded audio stream using PSQM, PAMS or other quality indicators (e.g., jitter, packet loss rate, and noise margin). From analysis based on the measurement, analyzer 25 can determine whether or not any software client or hardware module causes a problem in the voice transmissions. Results of the analysis are sent to a log file stored on client server 20 as a call history for further detailed diagnosis.

After VoIP client 21 completes the series of calls, test tool 22 sends a sequence of commands to poll software clients or hardware modules that participated the calls. The software clients or hardware modules return status information about their internal logics at the time when the calls were made. For example, a DSP chip may have a number of embedded circuits that collect measurements of noise level, number of packets received, or signal power during a call. The status information collected by test tool 22 is also stored in client server 20 as part of the call history for diagnostic purposes. The status information can be used in combination with the analysis results in the log file to generate a diagnostic report on the quality of one or more resources within VoIP network 10.

Figure 3:
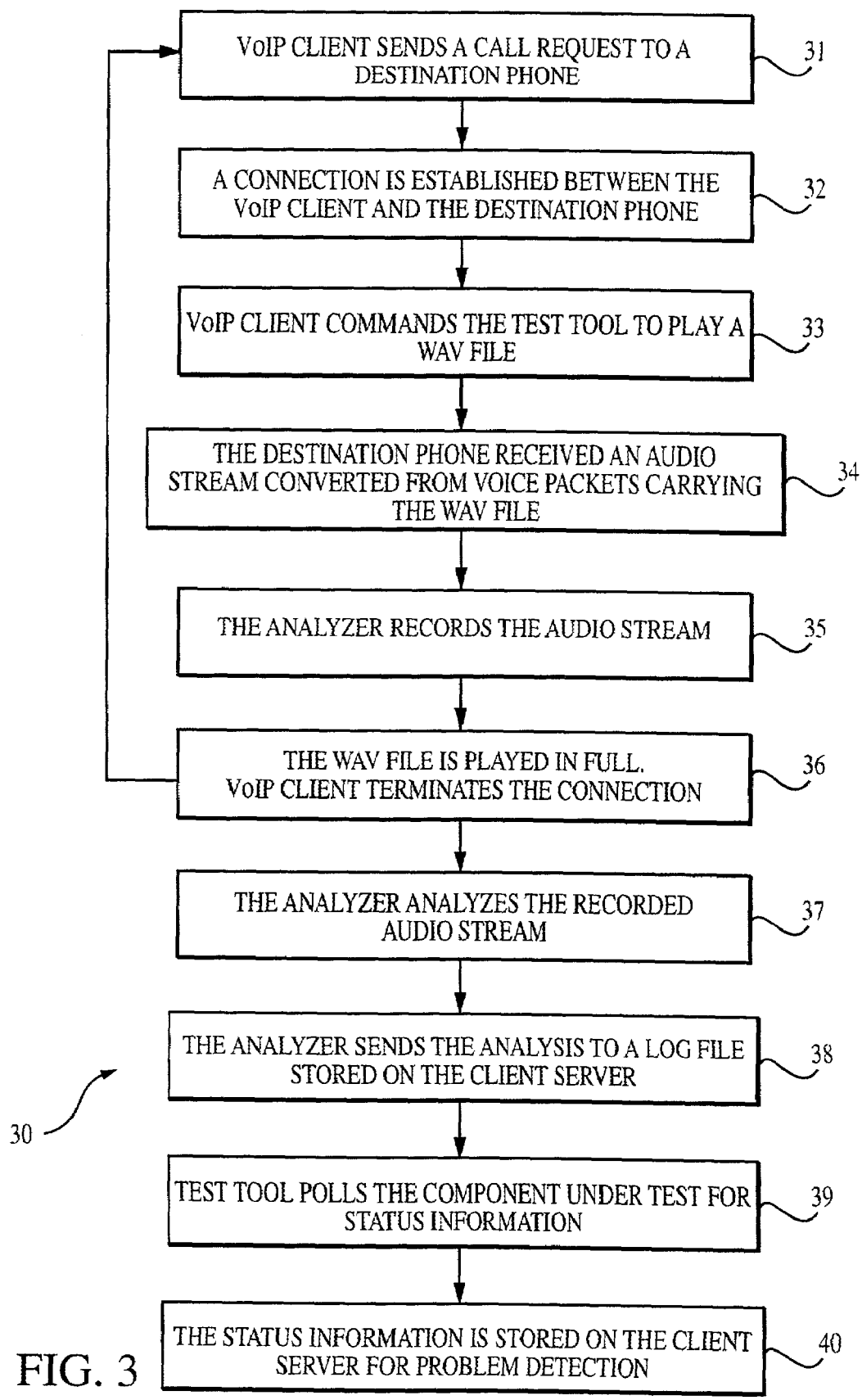
FIG. 3 illustrates a process of the test of FIG. 2.
Like reference symbols in the various drawings indicate like elements.

Referring to FIG. 3, a process 30 for testing voice quality of VoIP network 10 is shown. VoIP client 21 initially sends (31) a request to the destination phone 24 to establish a transmission path between the VoIP client 21 and destination phone 24. The request is routed by gatekeeper 14 and forwarded by gateway 13 to destination phone 24. After a sequence of hand-shaking occurs between the VoIP client 21 and destination phone 24, the transmission path is established (32). Once the transmission path is established (32), VoIP client 21 commands (33) test tool 22 to play a WAV file, which is sent to Internet 11 in the form of voice packets. The voice packets are routed by gatekeeper 14 and then converted (34) into an audio stream by a gateway 13 to reach destination phone 24.

When the audio stream reaches destination phone 24, analyzer 25 at the destination records (35) the audio stream during the call. After the WAV file is played in full, VoIP client 21 terminates (36) the call. Process 30 is repeated up to termination (36) for a predetermined number of times to place further calls to destination phone 24. Each time a call is placed, VoIP client 21 commands test tool 22 to play the same or a different WAV file. In the scenario as shown in FIG. 3, analyzer 25 analyzes (37) the recorded audio stream after all the calls are completed. Analyzer 25 generates analysis results based on the recorded stream, and sends (38) the results to a log file stored on client server 20.

After VoIP client 21 terminates the calls, test tool 22 polls software clients or hardware modules that participated in process 30 to collect (39) status information. The status information is stored on client server 20 for determining (40) the existence and cause of a problem on VoIP network 10.

Accordingly, other embodiments are within the scope of the following claims.

What is claimed is:

1. A method of testing a Quality of Service (QoS) of voice transmissions in a voice-over-IP network path comprising:
   performing a diagnostic procedure to identify one or more possibly faulty components among a plurality of network resources that reside in a plurality of transmission paths;
   determining a path of the plurality of transmission paths from a VoIP client to a destination node, the path including at least one of the one or more possibly faulty components identified by the diagnostic procedure;
   transmitting a digital audio file from the VoIP client to the destination node through the determined path;
   measuring characteristics of the digital audio file at the destination node to analyze the QoS of the transmission; and
   determining if one of the one or more possibly faulty components in the determined path is faulty.

2. The method of claim 1 further comprising polling at least one of the one or more possibly faulty components for status information.

3. The method of claim 2 further comprising generating a call history of at least one of the one or more possibly faulty components based on the status information.

4. The method of claim 1 further comprising repeating the transmitting.

5. The method of claim 1 further comprising repeating the transmitting.

6. The method of claim 1 wherein the digital audio file is a WAV file.

7. The method of claim 1 wherein at least one of the one or more possibly faulty components is a software client.

8. The method of claim 1 wherein at least one of the one or more possibly faulty components is a hardware module.

9. The method of claim 1 further comprising generating a call history of at least one of the one or more possibly faulty components based on the measuring of the digital audio file at the destination node.

10. The method of claim 1, further comprising recording the digital audio file at the destination node and wherein measuring characteristics of the digital audio file at the destination node comprises measuring characteristics of the recording.

11. The method of claim 1, wherein determining if one of the one or more possibly faulty components in the determined path is faulty comprises routing the digital audio file around at least one of the one or more possibly faulty components and determining if a change in the QoS of the voice transmission exists.

12. A voice-over-IP network comprising:
a plurality of network resources;
a source node selected from the plurality of network resources;
a destination node selected from the plurality of network resources;
a test tool capable of performing a diagnostic procedure to identify one or more possibly faulty components among the plurality of network resources that reside within a plurality of transmission paths between the source node and the destination node;
a determined path connecting the source node through at least one or more of the identified possibly faulty components to the destination node; and
an analyzer connected to the destination node to measure characteristics of a digital audio file received by the destination node and determine if one or more of the one or more possibly faulty components among the plurality of network resources that reside within a plurality of transmission paths between the source node and the destination node is faulty.

13. The network of claim 12 wherein the digital audio file is contained in a digital audio store.

14. The network of claim 12 further comprising a test tool accessible by the source node to poll the component for status information.

15. The system of claim 12 wherein at least one or more of the possibly faulty components among the plurality of network resources is a software client.

16. The system of claim 12 wherein at least one or more of the possibly faulty components among the plurality of network resources is a hardware module.

17. The system of claim 12 wherein the digital audio file is a way file.

18. A computer program product residing on a computer readable medium, the computer program comprising instructions that cause the computer to:
perform a diagnostic procedure to identify one or more possibly faulty components among a plurality of network resources that reside in a transmission path;
determine a path from a VoIP client to a destination node, wherein the path includes the one or more possibly faulty components identified by the diagnostic procedure;
transmit a digital audio file from the VoIP client to the destination node through the determined path;
measure characteristics of the digital audio file to analyze a Quality of Service (QoS) of the transmission; and
determine if one of the one or more possibly faulty components is faulty.

19. The computer program product of claim 18 wherein at least one of the one or more possibly faulty components is a software client.

20. The computer program product of claim 18 wherein at least one of the one or more possibly faulty components is a hardware module.

21. The computer program product of claim 18 wherein the digital audio file is a wav file.

22. A computer program product residing on a computer readable medium comprises instructions that cause the computer to:
perform a diagnostic procedure to identify one or more possibly faulty components among a plurality of network resources that reside in a transmission path;
determine a path from a VoIP client to a destination node, wherein the path includes the one or more possible faulty components identified by the diagnostic procedure; and
send a digital audio file from the VoIP client to the destination node through the determined path.

23. The computer program product of claim 22 wherein at least one or more of the possibly faulty components among the plurality of network resources is a software client.

24. The computer program product of claim 22 wherein at least one or more of the possibly faulty components among the plurality of network resources is a hardware module.

25. The computer program product of claim 22 wherein the digital audio file is a wav file.

26. The computer program product of claim 22, wherein the readable medium further comprises instructions that cause the computer to poll at least one of the one or more possibly faulty components for status information.

* * * * *

UNITED STATES PATENT AND TRADEMARK OFFICE
CERTIFICATE OF CORRECTION

PATENT NO. : 7,130,273 B2
APPLICATION NO. : 09/826697
DATED : October 31, 2006
INVENTOR(S) : Baj It is certified that error appears in the above-identified patent and that said Letters Patent is hereby corrected as shown below:

On the title page, in field (57), under "Abstract", in column 2, line 11, after "measurement" insert -- of --.

On page 2, in field (56), under "U.S. Patent Documents", in column 1, line 5, after "6,834,040" delete "B1" and insert -- B2 --, therefor.

On page 2, in field (56), under "U.S. Patent Documents", in column 1, line 8, after "6,940,820" delete "B1" and insert -- B2 --, therefor.

In column 1, line 8, delete "(VOIP)" and insert -- (VoIP) --, therefor.

In column 2, line 49, delete "(VOIP)" and insert -- (VoIP) --, therefor.

In column 6, line 55, in Claim 5, delete "transmitting" and insert -- sending, measuring, and determining --, therefor.

In column 7, line 33, in Claim 14, after "claim 12" delete "further comprising a" and insert -- wherein the --, therefor.

In column 7, line 33, in Claim 14, after "tool" insert -- is --.

In column 7, line 43, in Claim 17, delete "way" and insert -- wav --, therefor.

In column 8, line 30, in Claim 22, delete "possible" and insert -- possibly --, therefor.

Signed and Sealed this

Tenth Day of June, 2008

JON W. DUDAS
*Director of the United States Patent and Trademark Office*